United States Patent [19]

Rhodes et al.

[11] Patent Number: 5,458,791
[45] Date of Patent: Oct. 17, 1995

[54] STAR POLYMER VISCOSITY INDEX IMPROVER FOR OIL COMPOSITIONS

[75] Inventors: Robert B. Rhodes; Craig A. Stevens, both of Houston, Tex.

[73] Assignee: Shell Oil Company, Houston, Tex.

[21] Appl. No.: 269,724

[22] Filed: Jul. 1, 1994

[51] Int. Cl.$^6$ ................................................ C10M 143/12
[52] U.S. Cl. .......................... 252/43; 525/316; 525/901
[58] Field of Search ...................... 525/316, DIG. 901; 252/43

[56] References Cited

U.S. PATENT DOCUMENTS

| | | |
|---|---|---|
| Re. 27,145 | 6/1971 | Jones . |
| 3,231,635 | 1/1966 | Holden et al. ............................ 525/316 |
| 3,242,038 | 3/1966 | Dallas et al. ............................ 525/316 |
| 3,652,732 | 3/1972 | Makowski et al. . |
| 3,772,196 | 11/1973 | St. Clair et al. .................. 252/32.7 E |
| 3,956,426 | 5/1976 | Schepers ................................... 525/316 |
| 3,985,830 | 10/1976 | Fetters et al. ............................ 525/316 |
| 4,116,917 | 9/1978 | Eckert ................................... 526/335 |
| 4,141,847 | 2/1979 | Kiovsky ............................... 252/51.5 A |
| 4,156,673 | 5/1979 | Eckert . |
| 4,427,828 | 1/1984 | Hergenrother ............................ 525/66 |
| 4,578,429 | 3/1986 | Gergen et al. ........................... 525/291 |
| 4,849,481 | 7/1989 | Rhodes et al. ........................... 525/314 |
| 4,921,625 | 5/1990 | Gorman et al. ....................... 252/56 R |
| 5,073,600 | 12/1991 | Gorman et al. ........................... 525/264 |
| 5,218,044 | 6/1993 | Gellas et al. ............................... 525/66 |
| 5,310,490 | 5/1994 | Struglinski et al. . |

*Primary Examiner*—Margaret Medley
*Attorney, Agent, or Firm*—Keith M. Tackett

[57] ABSTRACT

The present invention includes star polymers which can be used as viscosity index improvers in oil compositions formulated for high performance engines. The star polymers have triblock copolymer arms of hydrogenated polyisoprene and polystyrene wherein the polystyrene is placed near the core of the star polymer to provide excellent low temperature performance and finishability as a polymer crumb.

14 Claims, No Drawings

STAR POLYMER VISCOSITY INDEX IMPROVER FOR OIL COMPOSITIONS

BACKGROUND OF THE INVENTION

This invention relates to star polymers containing styrene and hydrogenated isoprene or butadiene, and to oil compositions containing the star polymers.

The viscosity of lubricating oils varies with temperature. In general, oils are identified by a viscosity index which is a function of the oil kinematic viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature specified in the test is 100° C. For two engine lubricants with the same kinematic viscosity at 100° C., the one having the lower kinematic viscosity at 40° C. will have the higher viscosity index. The oil with the higher viscosity index undergoes less kinematic viscosity change between the temperatures of 40° C. and 100° C. In general, viscosity index improvers that are added to engine oils increase the viscosity index as well as the kinematic viscosities.

The SAE Standard J300 viscosity classification system does not specify the use of viscosity index to classify multigrade oils. At one time, however, the Standard did require that certain grades meet low-temperature viscosities that were extrapolated from kinematic viscosity measurements taken at higher temperatures, for it was recognized that oils that were exceedingly viscous at low-temperatures caused engine starting difficulties in cold weather. For this reason, multigrade oils which possessed high viscosity index values were favored; these oils gave the lowest low-temperature extrapolated viscosities. Since then, ASTM has developed the cold cranking simulator (CCS), ASTM D5293, a moderately high-shear-rate viscometer which correlates with engine cranking speed at low temperatures, and today cranking viscosity limits, determined by the CCS, are defined in the SAE J300 Standard.

Today, it is also recognized that cranking viscosity is not sufficient to fully estimate a lubricant's low-temperature performance in engines. SAE J300 also requires that a pumping viscosity be determined in a low-shear-rate viscometer called the mini-rotary viscometer (MRV). This instrument can be used to measure viscosity and gel formation, the latter by the measurement of yield stress. In this test, an oil is slowly cooled over a two-day period to a specified temperature before viscosity and yield stress are determined. A yield stress observation constitutes an automatic failure in this test, while pumping viscosity must be below a specified limit to ensure that the oil will not cause an engine to experience a pumping failure during cold weather conditions. The test is commonly referred to as the TP1-MRV test, ASTM D4684.

While SAE J300 does not require that other tests be run to ensure that good pumping viscosity is concerned, the Standard does suggest, for increased assurance that low-temperature pumping viscosity is good under varied low-temperature conditions, that the lubricant be evaluated in other low-temperature tests, one of which is the Scanning Brookfield test, ASTM D5133. In this test, a multigrade oil is cooled at the rate of 1° C./hour while the sample is continuously stirred with a spindle, and viscosity is measured by means of a Brookfield viscometer. This has an advantage in that viscosity can be continuously recorded as temperature is decreased.

Modern gasoline engines incorporate numerous improvements to reduce engine mechanical friction, and to make engine starting easier. These changes have largely been incorporated to improve fuel economy and reduce emissions. One result of this is that now many modern engines start at very low temperatures, and this increases the risk that engine pumping failures may occur in particularly cold weather. Pumping viscosity is a measure of the fluidity of the engine lubricant at low-temperatures. If the engine oil is too viscous to flow after an engine is started, catastrophic engine damage can occur. For this reason, it is important to develop engine lubricant components which have minimal contribution to the low-temperature, low-shear-rate viscosity in the TP1-MRV and which do not cause yield stress. Thus, it is desirable that the VI improver's contribution to pumping viscosity also be minimal.

Numerous materials are used in the formulation of fully-formulated multigraded engine oils. Besides the basestocks, which may include paraffinic, napthenic, and even synthetically-derived fluids, the polymeric VI improver, and the pour point depressants, there are numerous lubricant additives added which act as antiwear agents, antirust agents, detergents, dispersants, and pour point depressants. These lubricant additives are usually combined in diluent oil and are generally referred to as a dispersant-inhibitor package, or as a "DI" package.

Common practice in the formulation of a multigrade oil is to blend to a target kinematic viscosity and cranking viscosity, which is determined by the specified SAE grade requirements in SAE J300. The DI package and pour point depressant are combined with a VI improver oil concentrate and with one basestock, or two or more basestocks having different viscosity characteristics. For example, for an SAE 10W-30 multigrade, the concentration of the DI package and the pour point depressant might be held constant, but the amounts of HVI 100 neutral and HVI 250 neutral or HVI 300 neutral basestock might be adjusted along with the VI improver until the target viscosities are arrived at. For an SAE 5W-30, it is often common practice to use only one basestock such as HVI 100 neutral with the selected VI improver concentrate, DI package, and pour point depressant.

Once a formulation has been arrived at that has the targeted kinematic viscosities and cranking viscosities, the TP1-MRV viscosity is determined. A relatively low pumping viscosity and the absense of yield stress is desirable. The use of a VI improver which contributes little to low-temperature pumping viscosity or yield stress is very desirable in the formulation of multigrade oils; it minimizes the risk of formulating an oil that may cause an engine pumping failure and it provides the user with additional flexibility in the use of other lubricant components which contribute to pumping viscosity.

Oils sometimes fail the TP1-MRV because they have not been properly pour point depressed. When this occurs, wax precipitates on cooling in a way that lead to gelation or high viscosity. In all the formulated oil examples which follow, however, basestock components have been carefully matched to a pour point depressant so that deleterious wax formation does not cause a TP1-MRV failure.

When multigrade engine lubricants are manufactured, the VI improver is introduced in an oil concentrate. The VI improver may be transported to the manufacturing site as a solid, which may or may not have cold-flow characteristics, or as a liquid polymer in oil. If it is a solid, the VI improver is dissolved into basestock, such as HVI 100 neutral, before use. In some instances, the lubricant manufacturer may not have concentrate dissolving facilities, so the oil concentrate must be transported to the user as a concentrate rather than as a solid. To minimize transportation and storage costs, however, it is advantageous to be able to transport the VI improver as a solid, or as an oil concentrate that contains a high percentage of dissolved polymer. Thus, for two polymers that provide equivalent viscosities in multigrade oils, the one which can be handled at a higher concentration in an oil concentrate will be preferred. More polymer can be dissolved in the concentrate and transportation and storage costs will be minimized.

The limitation on the amount of polymer that can be used in a VI improver concentrate is dependent on the concentrate's viscosity at storage and handling temperatures. Sufficient fluidity must be maintained so that the concentrate can be readily pumped from the storage vessel into the oil blending vessel. The amount of polymer that can be added to a concentrate to ensure handleability can be determined by measuring the low-shear rate viscosity of the oil concentrate.

Generally, costs can also be reduced if a polymeric additive can be initially handled as a solid which does not cold-flow, for this generally reduces packaging and handling problems. Recently it has been discovered that certain asymmetric star-shaped polymers are both solid polymers and effective VI improvers for lubricating oil compositions as disclosed in U.S. Pat. No. 4,849,481. The patent describes asymmetric star polymers of conjugated diolefin blocks, such as polyisoprene, and monoalkenyl aromatic blocks, such as polystyrene. The asymmetric star polymers have sufficient amounts of the monoalkenyl aromatic blocks to be cyclone finishable as a polymer crumb. The star polymers contain a substanial amount of external monoalkenyl aromatic blocks and produce oil compositions having reduced high temperature, high shear rate (HTHSR) viscosities. However, along with 100° C. kinematic viscosity, minimum HTHSR viscosity limits are also now used to grade oils by SAE J300.

Although reduced HTHSR viscosities likely indicate good fuel efficiency, increased HTHSR viscosities are needed for high performance engines which operate at higher temperatures and rpms, or for engines having marginally designed journal bearings. Therefore, minimum HTHSR viscosities are now included in SAE J300. (The present version of the Standard is SAE J300, revision March 1993.) Star polymers disclosed in U.S. Pat. No. 4,849,481 that are crumb, cyclone-finishable polymers generally can provide sufficient 100° C. kinematic viscosities but provide insufficient HTHSR viscosity to meet SAE J300 requirements. To improve their HTHSR viscosity contribution, a sufficently low amount of monoalkenyl aromatic blocks may be used, but this reduces cyclone finishability. On the other hand, if more, or larger monoalkenyl blocks are used, then the polymer becomes gelated in oil at low-temperatures, and this results in a failing yield stress when the oil is evaluated in the TP1-MRV.

The star polymers in the present invention are readily produced by the process described in Canadian patent 716,645 and in U.S. Pat. No. Re 27,145. In U.S. Pat. No. 4,116,917, one polymer is disclosed which is compositionally similar to the present invention, but which is architecturally dissimilar due to the location of the polystrene block on the arm backbone. In example 16 of U.S. Pat. No. 4,116,917 a hydrogenated star-shaped poly(isoprene/styrene/isoprene) block copolymer is disclosed having arms made up of an (external) polyisoprene block molecular weight of 26,000, a central polystyrene block of 5,600 molecular weight, and another (inner) polyisoprene block of 23,200 molecular weight. The living anionic arms were coupled with divinylbenzene to make the star polymer, which was then hydrogenated. The ratio of the molecular weights of the external polyisoprene block to the internal polyisoprene block is 1.1. The patent also provides example 4, a hydrogenated star polymer made from homopolymer all-polyisoprene arms of 34,000 molecular weight, and example 1, a hydrogenated star polymer made from all-polyisoprene arms of 46,000 molecular weight. The rheological properties of these polymers were compared in multigrade oils in examples 21, 24, and 36, given in Table III of U.S. Pat. No. 4,116,917. Pumping viscosity measurements were not reported but cranking viscosity as determined in the CCS by ASTM D2602 (an earlier version of ASTM D5293), and viscosity index determinations showed no significant differences between this and the other examples.

Process oils which detract from VI improver properties often must be added to non-cyclone finishing polymers in order to finish the polymers by falling strand methods. For this reason, star polymers having low amounts of external monoalkenyl aromatic blocks were not specifically described or claimed in U.S. Pat. No. 4,849,481, which discloses asymmetric star polymers having some all-polyisoprene arms and some poly(styrene/isoprene) diblock arms, where the external blocks of the diblock arms contain monoalkenyl aromatic blocks. FIG. 1 of the patent does suggest that oil compositions such as multigrade SAE 10W-40 can be produced with the assymmetric star polymers having a low monoalkenyl aromatic block content. However, the patent does not suggest that the star polymers having low amounts of the monoalkenyl aromatic blocks would be both cyclone finishable and useful in preparing oil compositions having higher HTHSR viscosities.

SUMMARY OF THE INVENTION

The present invention includes star polymers useful as viscosity index improvers in oil compositions formulated for high performance engines. The star polymers have specific triblock copolymer arms of hydrogenated polyisoprene-polystyrene-polyisoprene which, relative to other star polymer VI improvers, contribute less to low temperature pumping viscosity, and in so doing often increase the viscosity index of multigrade oils. Some of the star polymers of this invention also have improved oil concentrate fluidity, relative to other hydrogenated star polymers. With either improvement, the polystyrene block is internal, yet the star polymers have good melt viscosities at 250° F.

DETAILED DESCRIPTION OF THE INVENTION

The star polymers of the present invention combine polystyrene blocks and hydrogenated polyisoprene blocks in molecules having the structure $(EP'\text{-}S\text{-}EP'')_n\text{-}X$, wherein EP' is the first hydrogenated blocks of polyisoprene (I') having a number average molecular weight ($MW_1$) between 10,000 and 100,000 before hydrogenation, S is a block of polystyrene having a number average molecular weight ($MW_S$) between 6,000 and 50,000, and EP" is a second hydrogenated blocks of polyisoprene (I") having a number average molecular weight between 2,500 and 50,000 before hydrogenation, the molecular weight ratio of I'/I" is at least 1.4, X is a nucleus of a polyalkenyl coupling agent, and n is the average number of (EP'-S-EP") arms per star molecule formed by reaction of 2 or more moles of the polyalkenyl coupling agent per mole of the arms. Prior to coupling, the arms have the structure polyisoprene-polystyrene-polyisoprene (I'-S-I"-Li). The star polymer is selectively hydrogenated to saturate at least 95% by weight of the isoprene units and less than 15% by weight of the styrene units.

The star polymers of the present invention are readily produced by the processes described in Canadian Patent No. 716,645 and U.S. Pat. No. Re 27,145 which process descriptions are incorporated by reference herein. However, the star polymers of the present invention have molecular weights which are not taught by the references and are selected to obtain surprisingly improved low temperature performance as a viscosity index improver.

Although the reason for the improvement at low temperatures is not fully understood, it is believed that modification of the star arms by placement of a polystyrene block between two polyisoprene blocks as described causes a smaller effective chain length at lower temperatures as a result of intramolecular association of the styrene blocks. When the temperature increases the styrene blocks can dis-associate giving longer effective chain lengths and a greater contribution to kinematic viscosity, which is not desired at the lower temperatures. Both the size and placement of the styrene blocks are critical for improved performance. The polymers described by this invention contribute less to viscosity as measured in the TP1-MRV and Scanning Brookfield tests. Some of the polymers described by this invention also provide multigrade oils with higher viscosity indexes than hydrogenated, all-polyisoprene star polymers or other hydrogenated poly(styrene/isoprene) block copolymer star polymers.

Polymers described by this invention that do not impart higher viscosity indexes and which have polystyrene molecular weights in the range of about 4,500 to 6,000 still offer lower TP1-MRV and Scanning Brookfield test results in multigrade blends than the commercial star polymer VI improvers, although their low-temperature viscosities in oil are higher than the preferred embodiments of the invention having higher polystyrene molecular weights and higher viscosity indexes. For low polystyrene block molecular weights on the order of 4,500 to 6,000, intramolecular dis-association occurs over a temperature range of −40° C. to about 0° C. To the extent that disassociation has occurred at the viscosity measurement temperature, the polymer will contribute increased viscosity. However, as polystyrene molecular weight is increased, the dis-association temperature increases. Eventually there is sufficient polystyrene so that the polymer arms are fully-collapsed at all TP1-MRV or Scanning Brookfield measurement temperatures. Since, SAEJ300 requires that the TP1-MRV viscosity measurement be over a range of −10° C. to −35° C. depending on the SAE W-grade, it is preferable to incorporate sufficient polystyrene so that intramolecular dis-association will begin to occur at temperatures above -10° C.

While low polystyrene molecular weights on the order of 4,500 to 6,000 do not generally provide the lowest contribution to low-temperature, low-shear-rate viscosity, these polymers do have lower 100° C. kinematic viscosities when blended into oil concentrates, provided the polystyrene block on the arms is appropriately positioned. However, if the styrene block is too far from the divinylbenzene core so that I'/I" is sufficiently low, intermolecular association of the styrene blocks can occur. For such polymers, intermolecular association may be exhibited at low temperatures, or at temperatures above 40° C. depending on the polystyrene molecular weight. For low-polystyrene molecular weights, low temperature pumping viscosities are expected to be higher and sometimes failing and there may be a failing yield stress exhibited in the TP1-MRV. For higher polystyrene molecular weights, intermolecular association and gel-like association may be exhibited at higher temperatures, such as at 40° C.; this may result in unsuitable kinematic viscosities, or poor kinematic reproducibility, on a day-to-day basis. Polymers that provide variable kinematic viscosities at 40° C. also provide variable viscosity indexes and are unsuitable for use.

As will be shown, the polymer described in Example 16, U.S. Pat. No. 4,849,481 contains a styrene block which is placed sufficiently close to the outer edge of the star polymer so that intermolecular association would occur in oil at low-temperatures where TP1-MRV viscosities and yield stresses are determined. This invention demonstrates that placement of the styrene blocks sufficiently close to the core improves the performance of the star polymer while preventing intermolecular association, gelation, or a higher pumping viscosity in fully formulated multigrade engine lubricants.

The present invention has an advantage of a previous discovery that cyclone finishable star polymers which provide high HTHSR viscosities in engine oils are prepared by addition of small polystyrene blocks to the star polymers. The previous discovery showed that polystyrene blocks enhanced cyclone-finishing without gelling the oil when the polystyrene blocks had 3,000 to 4,000 number average molecular weights and were at the external position, farthest away from the core.

In the present invention, it is surprising that the polystyrene blocks are still quite effective at enhancing cyclone-finishability and do not gel engine oil when the polystyrene blocks are moved to an internal position, closer to the core. It is also surprising that while good melt viscosity and good thickening efficiency in multigrade oils is retained with appropriate internal location of polystyrene blocks relative to an external location, the viscosity of heavily-doped oil concentrates can sometimes be reduced. Thus, VI improver oil concentrates may contain more polymer and less oil if the polystyrene block is appropriately positioned internally along the arm of the star polymer. This is particularly favored if the polystyrene block number average molecular weight is kept on the low side of the range, preferably between about 6,000 to 9,000.

The present invention includes the discovery that appropriately sized and placed polystyrene can lower oil concentrate viscosities at 100° C. relative to all-polyisoprene-armed stars, yet this placement does not decrease the polymer's contribution to 100° C. kinematic viscosity in fully-formulated multigrade oils.

The star polymers of this invention which are useful as VI improvers are preferably prepared by anionically polymerizing isoprene in the presence of sec-butyllithium, adding styrene, and then more isoprene to the living polystyrene molecules to make the living block copolymer molecules, coupling the living block copolymer molecules with a polyalkenyl coupling agent to form a star polymer, and selectively hydrogenating the polyisoprene blocks.

The star polymers of the present invention may be characterized prior to hydrogenation as having a dense center or nucleus of crosslinked poly(polyalkenyl coupling agent) and a number of block copolymer arms extending outwardly therefrom. The number of arms, as determined by conventional gel permeation chromatography (GPC), may vary considerably but typically range from about 6 to about 13. The actual number of arms is unknown since GPC-Low Angle Laser Light Scattering indicates a substantially greater number of arms than conventional GPC techniques.

In general, the star polymers may be selectively hydrogenated to saturate the polyisoprene blocks using any of the techniques known in the prior art to be suitable for selective hydrogenation of olefinic unsaturation over aromatic unsaturation. The hydrogenation conditions must be sufficient to hydrogenate at least 95% of the original olefinic unsaturation. Hydrogenation of aromatic unsaturation must be less than 15% to avoid reduction of the amount of polystyrene needed to finish the star polymers.

In general, hydrogenation involves the use of a suitable catalyst as described in U.S. Pat. No. Re 27,145 which is herein incorporated by reference. A mixture of nickel ethylhexanoate and triethylaluminum having 2.3 moles of aluminum per mole of nickel is preferred.

The hydrogenated star polymers of this invention may be added to a variety of lubricating oils to improve viscosity index characteristics. For example, the selectively hydrogenated star polymers may be added to fuel oils such as middle distillate fuels, synthetic and natural lubricating oils, crude oils and industrial oils. They may also be used in hydraulic fluids, automatic transmission fluids, and multigrade gear oils. In general, any amount of the selectively hydrogenated star polymers may be blended into the oils, with amounts from about 0.05 to about 10 wt % being most common. Amounts within the range from about 0.2 to about 5 wt % are preferred.

Lubricating oil compositions prepared with the selectively hydrogenated star polymers of this invention may also contain other additives such as anti-corrosive additives, antioxidants, detergents, pour point depressants, one or more additional VI improvers and the like. Typical additives which are useful in the lubricating oil composition of this invention and their description will be found in U.S. Pat. Nos. 3,772,196 and 3,835,083, the disclosure of which patents are herein incorporated by reference.

PREFERRED EMBODIMENT OF THE INVENTION

In a preferred embodiment of the present invention, the polystyrene blocks and the hydrogenated isoprene blocks are combined in molecules having the structure $(EP'-S-EP'')_n-X$, wherein the first hydrogenated blocks of polyisoprene (I') have a number average molecular weight $(MW_1)$ between 20,000 and 60,000 before hydrogenation, the polystyrene blocks (S) having a number average molecular weight $(MW_S)$ between 10,000 and 35,000, the second hydrogenated blocks of polyisoprene (I") having a number average molecular weight between 5,500 and 33,000 before hydrogenation, the molecular weight ratio of I'/I" is between 1.8 and 10.9, X is a nucleus of a polyalkenyl coupling agent, and n is the average number of (EP'-S-EP") arms per star molecule formed by reaction of 2 or more moles of the polyalkenyl coupling agent per mole of the arms.

The star polymer is produced by anionically polymerizing isoprene, then styrene, and then isoprene to produce living polyisoprene-polystyrene-polyisoprene-Li molecules. The living block copolymer molecules are most preferably coupled with divinylbenzene using 3 moles of divinylbenzene per mole of copolymer molecules. The coupled polymers are selectively hydrogenated with a solution of nickel ethylhexanoate and triethylaluminum having a preferred Al/Ni molar ratio of 2.3:1 to saturate at least 98% of the isoprene units and less than 10% of the styrene units.

Such star polymers are cyclone finishable as a polymer crumb and produce oil compositions having excellent high and low temperature viscosities suitable for high performance engines.

Having thus broadly described the present invention and the preferred embodiment, it is believed that the invention is further described by reference to the following examples. It will be appreciated, however, that the examples are presented solely for purposes of describing the invention and should not be construed as the limits of the invention.

EXAMPLE 1

In this example, a star polymer comprising triblock arms of hydrogenated isoprene and styrene was prepared. In the first step of the preparation, living polyisoprene blocks (I') were prepared by anionically polymerizing isoprene in cyclohexane. The polymerization of the isoprene was initiated by adding sec-butyllithium. The polymerization of the isoprene was completed to produce living polyisoprene blocks (I') having a number average molecular weight of 58,000. Polystyrene blocks were then formed by adding styrene to the solution of living polyisoprene blocks. The polymerization of styrene was completed to produce polystyrene blocks having a number average molecular weight of 36,000. Polyisoprene blocks were then formed by adding isoprene to the solution of living polyisoprene-polystyrene blocks. The second polymerization of isoprene was completed to produce second polyisoprene blocks (I") having a number average molecular weight of 7,000. The I'/I" molecular weight ratio was 8.3

The living tri-block copolymer arms were then coupled with divinylbenzene using 3 moles of divinylbenzene per mole of the living block copolymer molecules. The coupling reaction was allowed to proceed to completion after which the lithium sites remaining in the star polymer were deactivated by adding an alcohol.

The star polymer was next hydrogenated so as to saturate greater than 98% of the olefinic unsaturation originally contained in the isoprene blocks and less than 15% of the aromatic unsaturation using a catalyst prepared by combining nickel ethylhexanoate and triethylaluminum (2.3 moles of aluminum per mole of nickel). The melt viscosity of the star polymer was sufficiently high to permit finishing as a solid polymer crumb. The melt viscosity of the star polymer was 37 megapoise at 250° F. The data and results are summarized in Table 1.

EXAMPLE 2

In this example, a star polymer comprising isoprene/styrene/isoprene triblock copolymer arms was prepared using the procedure described in Example 1 except that the number average molecular weight of the first polyisoprene blocks (I") was 56,400, the polystyrene blocks (S) was 30,000, and the second polyisoprene blocks (I") was 2,500. The I'/I" molecular weight ratio was 22.6. The melt viscosity of the star polymer was 28 megapoise at 250° F. The data and results are summarized in Table 1.

EXAMPLE 3

Comparison

In this example, a star polymer comprising isoprene/styrene/isoprene triblock copolymer arms was prepared using the procedure described in Example 1 except that the number average molecular weight of the first polyisoprene blocks (I') was 2,800, the polystyrene blocks (S) was 34,100, and the second polyisoprene blocks (I") was 59,000. The I'/I" molecular weight ratio was 0.05. The melt viscosity of the star polymer was 122 megapoise at 250° F. The data and results are summarized in Table 1.

EXAMPLE 4

In this example, a star polymer comprising isoprene/styrene/isoprene triblock copolymer arms was prepared using the procedure described in Example 1 except that the number average molecular weight of the first polyisoprene blocks (I') was 38,400, the polystyrene blocks was 11,200 (S), and the second polyisoprene blocks (I") was 11,200. The molecular weight ratio of I'/I" was 3.4. The melt viscosity of the star polymer was 17.6 megapoise at 250° F. The data and results are summarized in Table 1.

EXAMPLE 5

In this example, a star polymer comprising isoprene/styrene/isoprene triblock copolymer arms was prepared using the procedure described in Example 1 except that the number average molecular weight of the first polyisoprene block (I') was 41,700, the polystyrene blocks (S) was 8,800, and the second polyisoprene blocks (I") was 5,500. The molecular weight ratio of I'/I" was 7.6. The melt viscosity of the star polymer was 9.7 megapoise at 250° F. Compositional data and melt viscosity results are summarized in Table 1.

EXAMPLE 6

In this example, a star polymer comprising isoprene/styrene/isoprene triblock copolymer arms was prepared using the procedure described in Example 1 except that the number average molecular weight of the first polyisoprene blocks (I') was 79,000, the polystyrene blocks (S) was 40,800, and the second polyisoprene blocks (I") was 4,500. The molecular weight ratio of I'/I" was 17.6. Compositional data are summarized in Table 1.

EXAMPLE 7

Comparison

In this example, a star polymer comprising isoprene/styrene/isoprene triblock copolymer arms was prepared using the procedure described in Example 1 except that the number average molecular weight of the first polyisoprene blocks (I') was 10,400, the polystyrene blocks (S) was 8,000, and the second polyisoprene blocks (I") was 51,000. The molecular weight ratio of I'/I" was 0.2. The melt viscosity of the star polymer was 55 megapoise at 250° F. Compositional data and melt viscosity results are summarized in Table 1.

EXAMPLE 8

In this example, a star polymer comprising isoprene/styrene/isoprene triblock copolymer arms was prepared using the procedure described in Example 1 except that the number average molecular weight of the first polyisoprene blocks (I') was 41,700, the polystyrene blocks (S) was 8,700, and the second polyisoprene blocks (I") was 5,100. The molecular weight ratio of I'/I" was 8.2. The melt viscosity of the star polymer was 8 megapoise at 250° F. Compositional data and melt viscosity results are summarized in Table 1.

EXAMPLE 9

Comparison

In this example, a star polymer comprising isoprene/styrene/isoprene triblock copolymer arms was prepared using the procedure described in Example 1 except that the number average molecular weight of the first polyisoprene blocks (I') was 24,700, the polystyrene blocks (S) was 7,100, and the second polyisoprene blocks (I") was 46,800. The molecular weight ratio of I'/I" was 0.5. The melt viscosity of the star polymer was 64 megapoise at 250° F. Compositional data and melt viscosity results are summarized in Table 1.

EXAMPLE 10

Comparison

In this example, a star polymer comprising isoprene/styrene/isoprene triblock copolymer arms was prepared using the procedure described in Example 1 except that the number average molecular weight of the first polyisoprene blocks (I') was 10,000, the polystyrene blocks (S) was 8,600, and the second polyisoprene blocks (I") was 44,900. The molecular weight ratio of I'/I" was 0.2. The melt viscosity of the star polymer was 64 megapoise at 250° F. Compositional data and melt viscosity results are summarized in Table 1.

EXAMPLE 11

In this example, a star polymer comprising isoprene/styrene/isoprene triblock copolymer arms was prepared using the procedure described in Example 1 except that the number average molecular weight of the first polyisoprene blocks (I') was 39,700, the polystyrene blocks (S) was 6,200, and the second polyisoprene blocks (I") was 15,700. The molecular weight ratio of I'/I" was 2.5. The melt viscosity of the star polymer was 19.5 megapoise at 250° F. Compositional data and melt viscosity results are summarized in Table 1.

EXAMPLE 12

Comparison

In this example, a star polymer comprising isoprene/styrene/isoprene triblock copolymer arms was prepared using the procedure described in Example 1 except that the number average molecular weight of the first polyisoprene blocks (I') was 34,800, the polystyrene blocks (S) was 5,700, and the second polyisoprene blocks (I") was 14,600. The molecular weight ratio of I'/I" was 2.3. The melt viscosity of the star polymer was 21 megapoise at 250° F. Compositional data and melt viscosity results are summarized in Table 1.

EXAMPLE 13

In this example, a star polymer comprising isoprene/styrene/isoprene triblock copolymer arms was prepared using the procedure described in Example 1 except that the number average molecular weight of the first polyisoprene blocks (I') was 35,200, the polystyrene blocks (S) was 15,700, and the second polyisoprene blocks (I") was 17,300. The molecular weight ratio of I'/I" was 2.0. The melt viscosity of the star polymer was 52 megapoise at 250° F. Compositional data and melt viscosity results are summarized in Table 1.

EXAMPLE 14

In this example, a star polymer comprising isoprene/styrene/isoprene triblock copolymer arms was prepared using the procedure described in Example 1 except that the number average molecular weight of the first polyisoprene blocks (I') was 35,000, the polystyrene blocks (S) was 24,900, and the second polyisoprene blocks (I") was 18,700. The molecular weight ratio of I'/I" was 1.9. The melt viscosity of the star polymer was 61 megapoise at 250° F. Compositional data and melt viscosity results are summarized in Table 1.

EXAMPLE 15

Comparison

In this example, a star polymer comprising isoprene/styrene/isoprene triblock copolymer arms was prepared using the procedure described in Example 1 except that the number average molecular weight of the first polyisoprene blocks (I') was 29,800, the polystyrene blocks (S) was 4,700, and the second polyisoprene blocks (I") was 13,200. The molecular weight ratio of I'/I" was 2.3. The melt viscosity of the star polymer was 17 megapoise at 250° F. Compositional data and melt viscosity results are summarized in Table 1.

EXAMPLE 16

Comparison

In this example, a star polymer comprising isoprene/styrene/isoprene triblock copolymer arms was prepared using the procedure described in Example 1 except that the number average molecular weight of the first polyisoprene blocks (I') was 28,800, the polystyrene blocks (S) was 4,700, and the second polyisoprene blocks (I") was 18,700. The molecular weight ratio of I'/I" was 1.5. The melt viscosity of the star polymer was 25 megapoise at 250° F. Compositional data and melt viscosity results are summarized in Table 1.

EXAMPLE 17

Comparison

In this example, a star polymer comprising isoprene/styrene/isoprene triblock copolymer arms was prepared using the procedure described in Example 1 except that the number average molecular weight of the first polyisoprene blocks (I') was 29,800, the polystyrene blocks (S) was 15,600, and the second polyisoprene blocks (I") was 23,000. The molecular weight ratio of I'/I" was 1.3. The melt viscosity of the star polymer was 55 megapoise at 250° F. Compositional data and melt viscosity results are summarized in Table 1.

EXAMPLE 18

Comparison

In this example, a star polymer comprising arms of a block copolymer containing a single block of polystyrene and a single block of hydrogenated polyisoprene was prepared. In the first step of the preparation, living molecules of polystyrene were prepared by anionically polymerizing styrene in cyclohexane. The polymerization of styrene was initiated by adding sec-butyllithium. The polymerization of the styrene was completed to produce living polystyrene molecules having a number average molecular weight of 3,300. Polyisoprene blocks were then formed by adding isoprene to the solution of living polystyrene molecules. The polymerization of isoprene was completed to produce polyisoprene blocks having a number average molecular weight of 51,200.

The living block copolymer arms were then coupled with divinylbenzene using 3 moles of divinylbenzene per mole of the living block copolymer molecules. The coupling reaction was allowed to proceed to completion after which the lithium sites remaining in the star polymer were deactivated by adding an alcohol.

The star polymer was next hydrogenated so as to saturate greater than 98% of the olefinic unsaturation originally contained in the isoprene blocks and less than 15% of the aromatic unsaturation using a catalyst prepared by combining nickel ethylhexanoate and triethylaluminum (2.3 moles of aluminum per mole of nickel). The melt viscosity of the star polymer was sufficiently high to permit finishing as a solid polymer crumb. The melt viscosity of the star polymer was 25.1 megapoise at 250° F. The data and results are summarized in Table 1.

EXAMPLE 19

Comparison

In this example, a hydrogenated asymmetric star polymer comprising arms of a block copolymer containing a single block of polystyrene and a single block of hydrogenated polyisoprene and arms of hydrogenated polyisoprene was prepared. In the first step of the preparation, living molecules of polystyrene were prepared by anionically polymerizing styrene in cyclohexane. The polymerization of the styrene was initiated by adding sec-butyllithium. The polymerization of the styrene was completed to produce living polystyrene molecules having a number average molecular weight of 7,800. Polyisoprene blocks were then simultaneously added to the polystyrene blocks and initiated as separate homopolymer blocks by adding additional sec-butyllithium and isoprene to the solution of living polystyrene molecules. The ratio of the second amount of sec-butyllithium to the first amount of sec-butyllithium was about 11:5. The polymerization of isoprene was then completed to produce polyisoprene blocks having a number average molecular weight of 46,400. The indicated ratio of sec-butyllithium prepares a mixture of about 30% living diblock copolymer molecules and 70% living polyisoprene molecules.

The living polymer molecules were then coupled with divinylbenzene using 3 moles of divinylbenzene per mole of the polymer molecules. The coupling reaction was allowed to proceed to completion after which the lithium sites remaining in the star polymer were deactivated by adding an alcohol.

The star polymer was next hydrogenated so as to saturate greater than 98% of the olefinic unsaturation originally contained in the polyisoprene and less than 15% of the aromatic unsaturation using the catalyst of Example 1 (2.3:1 Al/Ni). The ratio of block copolymer arms to homopolymer arms is believed to be the same as the ratio of these components in the initial blend of block copolymer molecules and homopolymer molecules used to prepare the star-shaped polymer; i.e. 5 to 11 or about 30% block copolymer arms. The melt viscosity of the asymmetric star polymer was 35.0 megapoise at 250° F. The data and results are summarized in Table 1.

EXAMPLE 20

Comparison

In this example, hydrogenation of the asymmetric star polymer of Example 19 was modified to hydrogenate about 23% of the aromatic unsaturation of the star polymer (2.6:1 Al/Ni). The melt viscosity of the star polymer was 36.8 megapoise at 250° F.

EXAMPLE 21

Comparison

In this example, an all-polyisoprene star polymer, having a polyisoprene molecular weight of 35,000 was prepared and hydrogenated, in accordance with known procedures. The melt viscosity of this star polymer is much less than 1 megapoise at 250° F.; it cannot be cyclone finished, and exhibits cold-flow properties at room temperature.

EXAMPLE 22

Comparison

In this example, an all-polyisoprene star polymer, having a polyisoprene arm molecular weight of 46,000 was prepared and hydrogenated, in accordance with known procedures. The melt viscosity of this star polymer is much less than 1 megapoise at 250° F. The data and results are summarized in Table 1.

EXAMPLES 23–26

Comparison

In these examples the star polymers produced in Examples 18, 19, 20, and 22 were used as VI improvers in a SAE 10W-40 multigrade lubricating oil composition. The basestock used in the preparation of the multigrade lubricating oil composition was a blend of an HVI 100N oil and an HVI 250N oil. The amount of each VI improver was varied so as to provide a lubricating oil composition having a kinematic viscosity of 14 centistokes (cst) at 100° C. The multigrade lubricating oil compositions prepared in these examples contained 31.0% by weight of HVI 250N (DP), 7.75 wt % of a commercially available API AG quality additive package (Lubrizol 7573A), and 0.3 wt % Acryloid 160. The viscosity index (VI), the cold cranking simulator (CCS) viscosity at –20° C., the engine oil pumpability (TP1) at –25° C. using the mini-rotary viscometer (ASTM D4684), and the high temperature, high shear rate (HTHSR) viscosity at 150° C. at $1\times10^6$ seconds$^{-1}$ in the tapered bearing simulator (TBS) (ASTM D4683) were determined for each oil composition.

All of these examples produced oil compositions from cyclone finished polymer crumb. The oil compositions have good HTHSR viscosities and excellent low temperature viscosities. The data and results are summarized in Table 2. It is seen from examples 23c through 26c that polymers 18c, 19c and 20c appear to contribute more to TP1-MRV viscosity than polymer 22c. However, example 26 contains 25% of the more viscous HVI 250 base stock.

TABLE 1

| Example | Isoprene MW$_I$ | Styrene MS$_S$ | Isoprene MW$_{I'}$ | I'/I'' | Finish as Crumb | Melt Vis 250° F. M Poise |
|---|---|---|---|---|---|---|
| 1 | 58,000 | 36,000 | 7,000 | 8.3 | Yes | 37 |
| 2 | 56,400 | 30,000 | 2,500 | 22.6 | Yes | 28 |
| 3 c | 2,800 | 34,600 | 59,000 | 0.05 | No | 12 |
| 4 | 38,400 | 11,200 | 11,200 | 3.4 | Yes | 18 |
| 5 | 41,700 | 8,800 | 5,500 | 7.6 | No | 9.7 |
| 6 | 79,000 | 40,800 | 4,500 | 17.6 | — | — |
| 7 c | 10,400 | 8,000 | 51,000 | 0.2 | Yes | 55 |
| 8 | 41,700 | 8,700 | 5,100 | 8.2 | No | 8.0 |
| 9 c | 24,700 | 7,100 | 46,800 | 0.5 | Yes | 64 |
| 10 c | 10,000 | 8,600 | 44,900 | 0.2 | Yes | 64 |
| 11 | 39,700 | 6,200 | 15,700 | 2.5 | Yes | 19.5 |
| 12 c | 33,800 | 5,700 | 14,600 | 2.3 | Yes | 21 |
| 13 | 35,200 | 15,700 | 17,300 | 2.0 | Yes | 52 |
| 14 | 35,000 | 24,900 | 18,700 | 1.9 | Yes | 61 |
| 15 c | 29,800 | 4,700 | 13,200 | 2.3 | Yes | 17 |
| 16 c | 28,000 | 4,700 | 18,700 | 1.5 | Yes | 25 |
| 17 c | 29,800 | 15,600 | 23,000 | 1.3 | Yes | 55 |
| 18 c | 0 | 3,300 | 51,200 | — | Yes | 25.1 |
| 19 c | 0 | 7,800* | 46,400 | — | Yes | 35.0 |
| 20 c | 0 | 7,800** | 46,400 | — | Yes | 36.8 |
| 21 c | 0 | 0 | 35,000 | — | No | <1 |
| 22 c | 0 | 0 | 46,500 | — | No | <1 |

*About 30% of the arms contained polystyrene blocks
**About 23% of aromatic unsaturation was hydrogenated

TABLE 2

| Example | Polymer Example | Polymer % wt. | CCS,cP | TP1-MRV,P | VI | TBS, cP |
|---|---|---|---|---|---|---|
| 23c | 18c | 0.97 | 3,490 | 220 | 153 | 3.49 |
| 24c | 19c | 1.04 | 3,230 | 264 | 155 | — |
| 25c | 20c | 1.04 | 3,150 | 182 | 156 | 3.44 |
| 26*c | 22c | 1.12 | 3,020 | 177 | 158 | 3.61 |

HVI 250 neutral was used at 25% in this blend

EXAMPLES 27–29

Comparison

In these examples the star polymers produced in Examples 18c, 19c, and 22c, were used as VI improvers in a SAE 5W-30 multigrade lubricating oil composition. The base stock used in the preparation of the multigrade contained only Atlas HVI 100N oil. The amount of each VI improver was varied so as to provide a lubricating oil composition having a kinematic viscosity of 10.5 centistokes (cst) at 100° C. The multigrade lubricating oil compositions prepared in these examples contained 9.1 wt % of a DI additive package (from Ethyl Corporation) and 0.3 wt % Hitec 623 pour point depressant. The viscosity index (VI), the cold cranking simulator (CCS) viscosity at –25° C., the engine oil pumpability (TP1) at –30° C. using the mini-rotary viscometer (ASTM D4684), and the high temperature, high shear rate (HTHSR) viscosity at 150° C. at $1\times10^6$ seconds$^{-1}$ in the tapered bearing simulator (TBS) (ASTM D4683) were determined for each lubricating oil composition. Results are in Table 3, which show that each polymer in examples 27c, 28c, and 29c provide comparable TP1-MRV viscosities.

TABLE 3

| Example | Polymer Example | Polymer % Wt. | CCS.cP | TP1-MRV,P | VI | TBS, cP |
|---|---|---|---|---|---|---|
| 27c | 18c | 0.83 | 3,020 | 201 | 160 | 2.91 |
| 28c | 19C | 0.89 | 3,050 | 238 | 159 | 2.87 |
| 29c | 22c | 0.98 | 3,330 | 213 | 160 | 2.98 |

EXAMPLE 30–48

In these examples the star polymers of examples 1–18, and 22 were used as VI improvers in a SAE 10W-40 multigrade lubricating oil composition. The basestock used in the preparation of the multigrade lubricating oil composition was a blend of an HVI 100N oil and an HVI 250N oil. The amount of each VI improver was varied so as to provide a lubricating oil composition having a kinematic viscosity of 14 centistokes (cst) at 100° C. The multigrade lubricating oil compositions prepared in these examples contained 11.6% by weight of a commercially available DI package (ECA 12850, available from Exxon Chemical), and 0.3 wt % pour point depressant Acryloid 160 (available from Rohm and Haas). The viscosity index (VI), the cold cranking simulator (CCS) viscosity at –20° C., the engine oil pumpability (TP1) at –25° C. using the mini-rotary viscometer (ASTM D4684), and the high temperature, high shear rate (HTHSR) viscosity at 150° C. at $1\times10^6$ seconds$^{-1}$ in the tapered bearing simulator (TBS) (ASTM D4683) were determined for each lubricating oil composition and are reported in Table 4.

EXAMPLES 49–65

In these examples the star polymers produced in polymer examples 1 through 22 were used as VI improvers in a SAE 5W-30 multigrade lubricating oil composition. The basestock used in the preparation of the multigrade lubricating oil was Exxon HVI 100N low-pour basestock. The amount of each VI improver was varied so as to provide a lubricating oil composition having a kinematic viscosity of 10.5 centistokes (cst) at 100° C. The multigrade lubricating oil compositions prepared in these examples contained 11.60% weight of a commercially available DI additive package, ECA 12850 (from Exxon Chemical-Paramins), 0.5 wt % Acryloid 160 pour point depressant, and Exxon HVI 100 neutral low-pour point basestock. The Control sample contains these same ingredients, at the same percent weights, but there is no polymer in the blend. The viscosity index (VI), the cold cranking simulator (CCS) viscosity at –25° C., the engine oil pumpability (TP1) at –30° C. using the mini-rotary viscometer (ASTM D4684), and the high temperature, high shear rate (HTHSR) viscosity at 150° C. at $1\times10^6$ seconds$^{-1}$ in the tapered bearing simulator (TBS) (ASTM D4683) were determined for each lubricating oil composition. Results are in Table 5. Scanning Brookfield tests (ASTM D5133) were also run; results are reported at the temperature where viscosity was 5,000, 10,000, 20,000, 30,000, and 40,000 cP. Scanning Brookfield results are in Table 6.

TABLE 4

| Example | Polymer Example | Polymer % Wt. | CCS,cP | TP1-MRV,P | VI | TBS, cP |
|---|---|---|---|---|---|---|
| 30 | 1 | 1.20 | 3,050 | 146 | 162 | 3.62 |
| 31 | 2 | 1.33 | 3,060 | 148 | 161 | 3.64 |
| 32 c[1] | 3 c | — | — | — | — | — |
| 33 | 4 | 1.07 | 3,110 | 131 | 173 | 3.62 |
| 34 | 5 | 1.08 | 3,170 | 150 | 163 | 3.62 |
| 35 | 6 | 0.97 | 2,640 | 125 | 166 | 3.30 |
| 36 c | 7 c | 0.93 | 3,170 | — | 159 | 3.59 |
| 37 | 8 | 1.24 | 3,270 | 166 | 160 | 3.75 |
| 38 c | 9 c | 0.80 | 3,160 | 266 | 160 | 3.46 |
| 39 c | 10 c | 0.96 | 3,150 | y.s.[2] | 161 | 3.51 |
| 40 | 11 | 0.97 | 2,940 | 140 | 162 | 3.62 |
| 41 c | 12 c | 1.03 | 2,950 | 144 | 161 | 3.64 |
| 42 | 13 | 1.10 | 2,600 | 98 | 189 | 3.65 |
| 43 | 14 | 1.2B | 2,600 | 97 | 185 | 3.71 |
| 44 c | 15 c | 1.12 | 3,070 | 155 | 161 | 3.59 |

TABLE 4-continued

| Example | Polymer Example | Polymer % Wt. | CCS,cP | TP1-MRV,P | VI | TBS, cP |
|---|---|---|---|---|---|---|
| 45 c | 16 c | 1.05 | 3,010 | 156 | 161 | 3.69 |
| 46[3] c | 17 c | 1.07 | 2,610 | 127 | Var. | 3.62 |
| 47 c | 18 c | 0.97 | 3,200 | 173 | 159 | 3.60 |
| 48 c | 22 c | 1.02 | 3,250 | 174 | 159 | 3.66 |

[1]Oil sample a gel at room temperature
[2]yield stress failure
[3]Variable kinematic viscosity at 40C, variable VI, on storage; some evidence of gelation at room temperature, not suitable for use as engine oil.

TABLE 5

| Example | Polymer Example | Polymer % wt. | CCS,cP | TP1-MRV,P | VI | TBS, cP |
|---|---|---|---|---|---|---|
| 49 | 1 | 0.93 | 3,110 | 136 | 162 | — |
| 50 | 2 | 0.97 | 3,090 | 125 | 162 | — |
| 51 | 4 | 0.80 | 3,290 | 147 | 172 | 3.09 |
| 52 | 5 | 0.79 | 3,330 | 153 | 163 | 3.12 |
| 53 | 6 | 0.73 | 3,220 | 139 | 163 | — |
| 54 | 8 | 0.90 | 3,210 | 138 | 161 | — |
| 55 c | 9 c | 0.60 | 3,100 | 178 | 161 | — |
| 56 | 11 | 0.73 | 3,100 | 131 | 163 | 3.03 |
| 57 c | 12 c | 0.73 | 3,110 | 130 | 161 | 3.00 |
| 58 | 13 | 0.81 | 3,050 | 116 | 190 | 3.07 |
| 59 | 14 | 0.93 | 3,110 | 116 | 185 | 3.10 |
| 60 c | 15 c | 0.87 | 3,100 | 114 | 163 | 3.09 |
| 61 c | 16 c | 0.80 | 3,050 | 132 | 163 | 3.05 |
| 62*c | 17 c | 0.76 | 3,100 | 125 | Var | 3.01 |
| 63 c | 18 c | 0.72 | 3,380 | 168 | 159 | 3.08 |
| 64 c | 21 c | 0.89 | 3,180 | 140 | 161 | — |
| 65 c | 22 c | 0.78 | 3,390 | 172 | 161 | 3.12 |
| Control | None | — | 2,810 | 82 | 129 | 2.13 |

*Variable 40° C. kinematic viscosity and viscosity index on storage, some gelation tendency at room temperature but no evidence in TP1-MRV At –30° C.

TABLE 6

| Example | Polymer Example | Scanning Brookfield, Temperature where viscosity is ... | | | | |
|---|---|---|---|---|---|---|
| | | 5,000 cP | 10,000 cP | 20,000 cP | 30,000 cP | 40,000 cP |
| 49 | 1 | –22.9 | –27.1 | –29.7 | –31.9 | –33.5 |
| 50 | 2 | –23.5 | –27.4 | –29.9 | –32.1 | –33.7 |
| 51 | 4 | –23.6 | –27.1 | –30.4 | –32.7 | –34.1 |
| 52 | 5 | –23.3 | –26.9 | –30.2 | –32.5 | –33.9 |
| 53 | 6 | –22.9 | –27.0 | –29.5 | –31.6 | –33.1 |
| 54 | 8 | –22.8 | –27.0 | –29.7 | –31.9 | –33.5 |
| 55 c | 9 c | –21.9 | –25.3 | –28.1 | –29.6 | –31.0 |
| 56 | 11 | –23.5 | –27.6 | –30.6 | –33.0 | –34.6 |
| 57 c | 12c | –23.5 | –27.7 | –30.5 | –32.9 | –34.5 |
| 58 | 13 | –25.0 | –28.4 | –31.2 | –33.5 | –35.0 |
| 59 | 14 | –24.0 | –28.4 | –31.2 | –33.5 | –35.0 |
| 60 c | 15 c | –23.6 | –27.7 | –30.6 | –33.0 | –34.6 |
| 61 c | 16 c | –23.5 | –27.3 | –29.8 | –32.0 | –33.6 |
| 62 c | 17 c | –23.2 | –27.5 | –30.1 | –32.3 | –34.0 |
| 63 c | 18 c | –22.4 | –26.6 | –29.7 | –32.0 | –33.5 |
| 64 c | 21 c | –23.3 | –27.4 | –30.3 | –32.6 | –34.2 |
| 65 c | 22 c | –22.3 | –26.6 | –29.9 | –32.2 | –33.7 |
| Control | none | –27.0 | –29.0 | –32.5 | –34.3 | –35.4 |

The present invention is defined by the following claims and is not limited to the specific embodiments described in the preceeding examples.

What is claimed is:

1. A star polymer useful as a viscosity index (VI) improver, comprising:

polystyrene blocks; and hydrogenated polyisoprene blocks combined with the polystyrene blocks in molecules having the structure (EP'-S-EP")$_n$-X;

wherein EP' is first hydrogenated blocks of polyisoprene (I') having a number average molecular weight (MW$_1$) between 10,000 and 100,000 before hydrogenation;

S is blocks of polystyrene having a number average molecular weight (MW$_S$) between 6,000 and 50,000;

EP" is second hydrogenated blocks of polyisoprene (I") having a number average molecular weight (MW$_1$) between 2,500 and 50,000 before hydrogenation;

the molecular weight ratio of I'/I" is at least 1.4;

the polyisoprene blocks are at least 95% hydrogenated; less than 15% of the aromatic unsaturation is hydrogenated;

X is a nucleus of a polyalkenyl coupling agent; and n is the average number of (EP'-S-EP") arms per star molecule formed by reaction of 2 or more moles of the polyalkenyl coupling agent per mole of the arms.

2. The star polymer of claim 1, wherein the polyalkenyl coupling agent is divinylbenzene.

3. The star polymer of claim 2, wherein the molecular weight of the first polyisoprene blocks (I') is between 20,000 and 60,000, the molecular weight of the second polyisoprene blocks (I") is between 5,500 and 33,000, and the ratio of the molecular weight of the first blocks (I') divided by the second blocks (I") is between 1.8 and 10.9.

4. The star polymer of claim 3, wherein the molecular weight of the polystyrene block is from 10,000 to 35,000.

5. The star polymer of claim 4, wherein n is the average number of arms per molecule when coupled with 3 moles of divinylbenzene per mole of the arms.

6. The star polymer of claim 1, wherein the polyisoprene blocks are at least 98% hydrogenated.

7. The star polymer of claim 6, wherein less than 10% of the aromatic unsaturation is hydrogenated.

8. An oil composition comprising:

a base lubricating oil; and a viscosity improving amount of a star polymer, comprising:

polystyrene blocks; and hydrogenated polyisoprene blocks combined with the polystyrene blocks in molecules having the structure (EP'-S-EP")$_n$-X;

wherein EP' is first hydrogenated blocks of polyisoprene (I') having a number average molecular weight (MW$_1$) between 10,000 and 100,000 before hydrogenation;

S is blocks of polystyrene having a number average molecular weight (MW$_S$) between 6,000 and 50,000;

EP" is second hydrogenated blocks of polyisoprene (I") having a number average molecular weight (MW$_1$) between 2,500 and 50,000 before hydrogenation;

the polyisoprene blocks are at least 95% hydrogenated; less than 15% of the aromatic unsaturation is hydrogenated;

the molecular weight ratio of I'/I" is at least 1.4;

X is a nucleus of a polyalkenyl coupling agent; and n is the average number of (EP'-S-EP") arms per star molecule formed by reaction of 2 or more moles of the polyalkenyl coupling agent per mole of the arms.

9. The oil composition of claim 8, wherein the polyalkenyl coupling agent is divinylbenzene.

10. The oil compositon of claim 9, wherein the molecular weight of the first polyisoprene block is between 20,000 and 60,000, the molecular weight of the second polyisoprene block is between 5,500 and 33,000, and the ratio of the molecular weights of the first and second blocks is between 1.8 and 10.9.

11. The oil composition of claim 10, wherein the molecular weight of the polystyrene block is from 10,000 to 35,000.

12. The oil composition of claim 11, wherein n is the average number of arms coupled with 3 moles of divinylbenzene per mole of the arms.

13. The oil composition of claim 8, wherein the polyisoprene blocks are at least 98% hydrogenated.

14. The oil composition of claim 13, wherein less than 10% of the aromatic unsaturation is hydrogenated.

* * * * *